United States Patent [19]

Yoda

[11] Patent Number: 5,430,592
[45] Date of Patent: Jul. 4, 1995

[54] METHOD OF MANUFACTURING A MAGNETO-RESISTIVE HEAD ADAPTED TO BE USED AS THE REPRODUCING HEAD OF A MAGNETIC RECORDING/REPRODUCING DEVICE

[75] Inventor: Hiroaki Yoda, Kawasaki, Japan

[73] Assignee: Kabushiki Kaisha Toshiba, Kawasaki, Japan

[21] Appl. No.: 277,368

[22] Filed: Jul. 20, 1994

Related U.S. Application Data

[63] Continuation of Ser. No. 950,587, Sep. 25, 1992, abandoned.

[30] Foreign Application Priority Data

Sep. 27, 1991 [JP] Japan ................................ 3-249137

[51] Int. Cl.6 .............................................. G11B 5/39
[52] U.S. Cl. ...................... 360/113; 29/603; 427/130
[58] Field of Search ................ 360/113, 126; 29/603; 427/130, 131; 324/252; 338/32 R

[56] References Cited

U.S. PATENT DOCUMENTS

| | | | |
|---|---|---|---|
| 4,663,685 | 5/1987 | Tsang | 360/113 |
| 5,018,037 | 5/1991 | Krounbi et al. | 360/113 |
| 5,032,945 | 7/1991 | Argyle et al. | 360/126 |
| 5,079,035 | 1/1992 | Krounbi et al. | 360/113 |

FOREIGN PATENT DOCUMENTS

| | | |
|---|---|---|
| 63-298705 | 12/1988 | Japan . |
| 3-125311 | 5/1991 | Japan . |

*Primary Examiner*—Stuart S. Levy
*Assistant Examiner*—Paul J. Ditmyer
*Attorney, Agent, or Firm*—Oblon, Spivak, McClelland, Maier, & Neustadt

[57] ABSTRACT

In a magneto-resistive device having a magneto-resistive device and conductive leads connected to both end portions of the magneto-resistive device, the two end portions of the magneto-resistive device are altered into hard magnetic material portions by introducing a impurity element such as a material forming the conductive lead and the two end portions which are altered into the hard magnetic material portions are magnetized to have at least magnetic components parallel to the longitudinal direction of the magneto-resistive device.

33 Claims, 7 Drawing Sheets

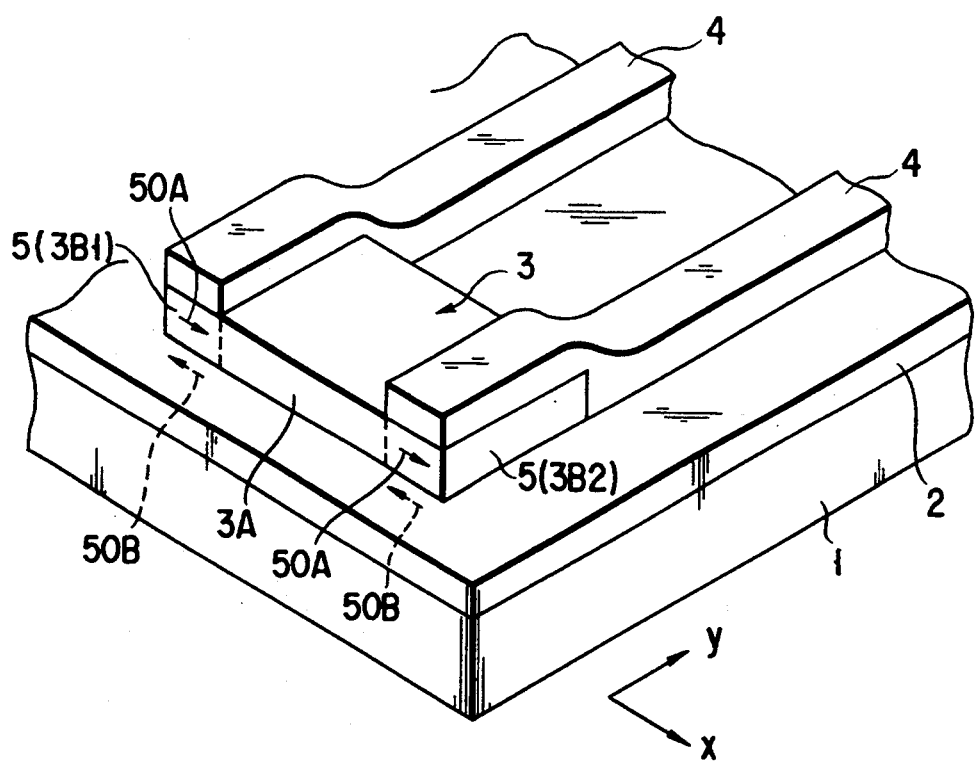
F I G. 3

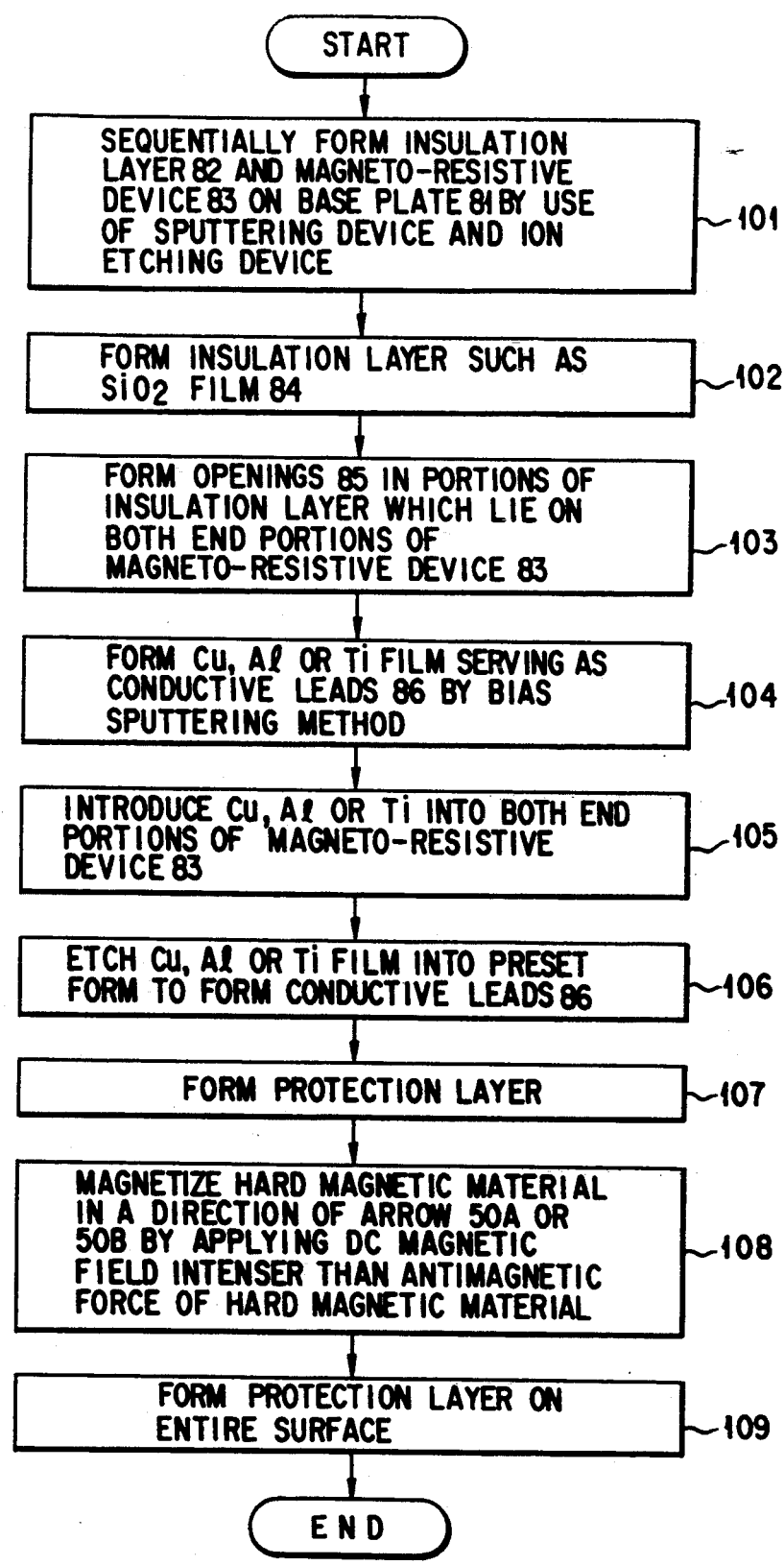
F I G. 4

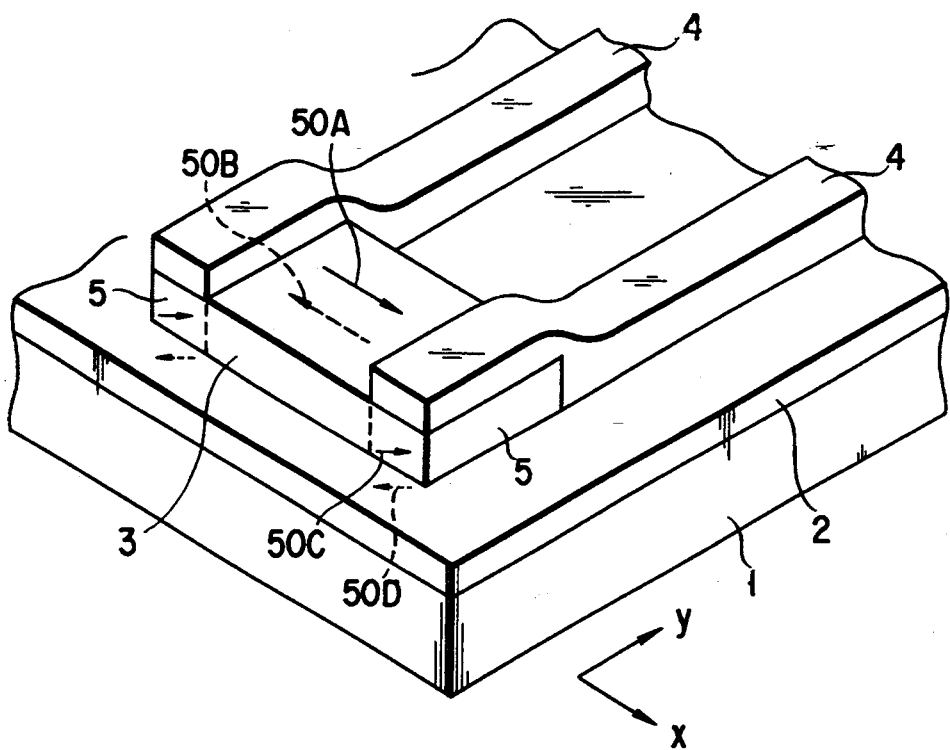
F I G. 8
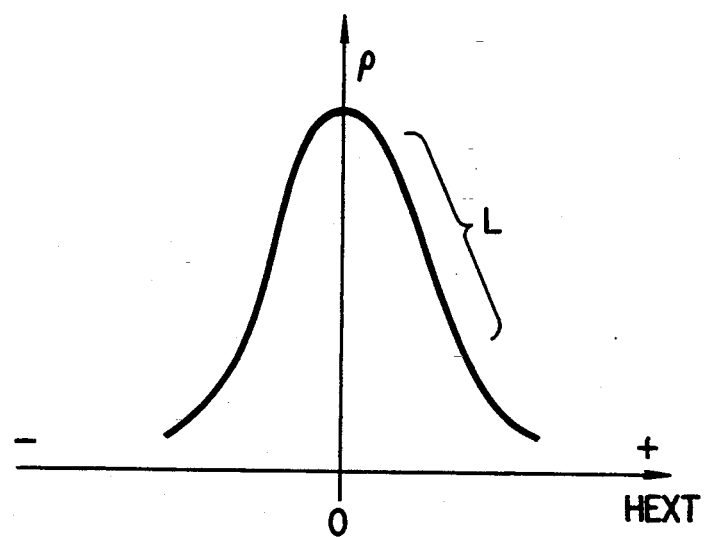
F I G. 9

METHOD OF MANUFACTURING A MAGNETO-RESISTIVE HEAD ADAPTED TO BE USED AS THE REPRODUCING HEAD OF A MAGNETIC RECORDING/REPRODUCING DEVICE

This application is a continuation of application Ser. No. 07/950,587, filed on Sep. 25, 1992, now abandoned.

BACKGROUND OF THE INVENTION

1. Field of the Invention

This invention relates to a magneto-resistive head used as the reproducing head of a magnetic recording/reproducing device and to a method for manufacturing the same.

2. Description of the Related Art

A magneto-resistive head has received much attention as the magnetic head for reproducing a signal recorded on a magnetic recording medium. The magneto-resistive head is a reproducing head constructed by use of a device called a magneto-resistive device (which is hereinafter referred to as an MR device). The MR device detects the signal magnetic field recorded on the magnetic recording medium as change in the electrical resistance caused by variation in the mean magnetization direction of the MR device by use of the phenomenon that the electrical resistance of a ferromagnetic material will change according to the intensity of the external magnetic field. Change in the electrical resistance of the MR device is detected as the voltage drop or current change caused when a sense current is passed through the MR device.

Since the above magneto-resistive head can supply a large reproducing output irrespective of the relative speed of the head with respect to the magnetic recording medium, it can be adequately used as a reproducing head of a magnetic recording/reproducing device such as a magnetic disk device of small size and large capacity.

However, the magneto-resistive head has a particular problem called Barkhausen noise which is caused by the movement of the magnetic domain wall in the MR device. In order to suppress the above noise, the magnetic domain wall may be fixed or removed, that is, the MR device may be formed with the unimagnetic domain structure. Generally, the latter method is used. Formation of the MR device with the unimagnetic domain structure is disclosed in the article by H. Bajoureck et al. AIP Conference Proceedings No. 10, Part 1, "Magnetism and Magnetic Materials", for example.

In order to form the MR device with the stable unimagnetic domain structure, it is effective to apply a bias magnetic field in the longitudinal direction of the MR device which is intenser than the antimagnetic field (approx. 4 $\pi$Ms·t/w) in the longitudinal direction of the MR device caused by the shape demagnetization of the MR device. In this case, t indicates the thickness of the MR device, w indicates the width thereof and Ms indicates the saturation magnetization. In order to realize the above method, a magneto-resistive head shown in FIG. 1 is proposed (which is disclosed in "Technical Paper of Institute of Electronics and Communication Engineers of Japan" MR86-37, by Shiiba et al, for example). The magneto-resistive head has an MR device 13 formed on a base plate 11 with an insulation layer 12 disposed therebetween. Hard magnetic material layers 15 are respectively disposed on the end portions of the MR device 13 and between the end portions and conductive leads 14 for power supply. A bias magnetic field can be applied in the longitudinal direction of the MR device 13 by magnetizing the hard magnetic material layers 15 in the longitudinal direction of the MR device 13.

Further, a magneto-resistive head shown in FIG. 2 is proposed (which is disclosed in U.S. Pat. No. 4,663,685). The magneto-resistive head has antiferromagnetic material layers 16 formed on the end portions of the MR device 13. A bias magnetic field can be applied to only the areas of the MR device 13 which lie directly under the antiferromagnetic material layers 16 by the exchange interaction (exchange coupling) between the magnetic material layers.

However, in the magneto-resistive head shown in FIG. 1 or 2, it is necessary to additionally provide a member such as the hard magnetic material layers 15 or antiferromagnetic material layers 16 for applying the bias magnetic field and the manufacturing process is complicated. Further, it is necessary to provide a space for disposing the member for applying the bias magnetic field, thereby making it difficult to attain the multichannel structure which is one of the features of the magneto-resistive head.

In the case of the magneto-resistive head shown in FIG. 2, the following problems occur. That is, the end portion of the MR device 13 will be placed on adjacent tracks of the magnetic recording medium and information of the unwanted adjacent track is detected. For this reason, problems such as occurrence of cross-talk noise and corrosion of the antiferromagnetic material layer 16 are provided in the practical case.

SUMMARY OF THE INVENTION

Accordingly, an object of this invention is to provide a magneto-resistive head capable of applying a bias magnetic field to an MR device for attaining the unimagnetic domain structure without additionally providing a special member and a method for manufacturing the same.

The above object can be attained by a magneto-resistive head comprising a magneto-resistive device having a first area for sensing the magnetic field by the magneto-resistive characteristic and at least two second areas having at least two portions which are formed with the first area disposed therebetween and which are formed of hard magnetic material obtained by alteration of the composition; and at least two conductive members connected to the second areas of the magneto-resistive device.

Further, the above object can be attained by a magneto-resistive head comprising a magneto-resistive device having a specified dimension in the longitudinal direction; and conductive members connected to both end portions of the magneto-resistive device in the longitudinal direction, wherein the both end portions of the magneto-resistive device in the longitudinal direction are formed of hard magnetic material by introducing an impurity element so as to have magnetic components which are parallel to the longitudinal direction.

Further, the above object can be attained by a method of manufacturing a magneto-resistive head including a magneto-resistive device having a specified dimension in the longitudinal direction and conductive members connected to both end portions of the magneto-resistive device in the longitudinal direction, wherein the method comprises the steps of forming the conductive members on both end portions of the magneto-resistive device in the longitudinal direction; and subjecting the both end portions of the magneto-resistive device in the longitudinal direction to the composition changing process so as to form the both end portions of the magneto-resistive device in the longitudinal direction as hard magnetic material areas.

With the above construction, both end portions of the magneto-resistive device which are formed of hard magnetic material are magnetized to have magnetic components parallel to the longitudinal direction of the magneto-resistive device so that they will apply a bias magnetic field to a portion (magnetically sensitive portion) of the magneto-resistive device other than the both end portions thereof in the longitudinal direction thereof. The magnetically sensitive portion is changed to have a unimagnetic domain structure by application of the bias magnetic field in the longitudinal direction, making it possible to prevent occurrence of Barkhausen noise.

In the magneto-resistive head of this invention, since the bias magnetic field is generated by means of the both end portions of the magneto-resistive device, the magneto-resistive device can be changed to have a unimagnetic domain structure without additionally providing a new member.

Further, if the both end portions of the magneto-resistive device which are formed of hard magnetic material are magnetized to have magnetic components in an oblique direction with respect to the longitudinal direction of the magneto-resistive device, the operation point of the magneto-resistive device can be set into a region in which the magneto-resistivity/electromagnetic field conversion characteristic is substantially linear by combining the above oblique magnetic field with a self-magnetic field caused in the magneto-resistive device by a current flowing in the magneto-resistive device. That is, the both end portions of the magneto-resistive device which are formed of hard magnetic material can be used as a bias magnetic field generating source for forming a unimagnetic domain structure and biasing the operation point.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a perspective view of the main portion of a magneto-resistive head according to one embodiment of this invention;

FIG. 4 is a flowchart showing a first example of a method for manufacturing the magneto-resistive head of this invention;

FIG. 8 is a perspective view of the main portion of a magneto-resistive head according to another embodiment of this invention; and FIG. 9 is a diagram showing the magneto-resistive/electromagnetic field conversion characteristic of an MR device for illustrating the effect of the magneto-resistive head of the above embodiment.

DETAILED DESCRIPTION OF THE PREFERRED EMBODIMENTS

Figure 1:
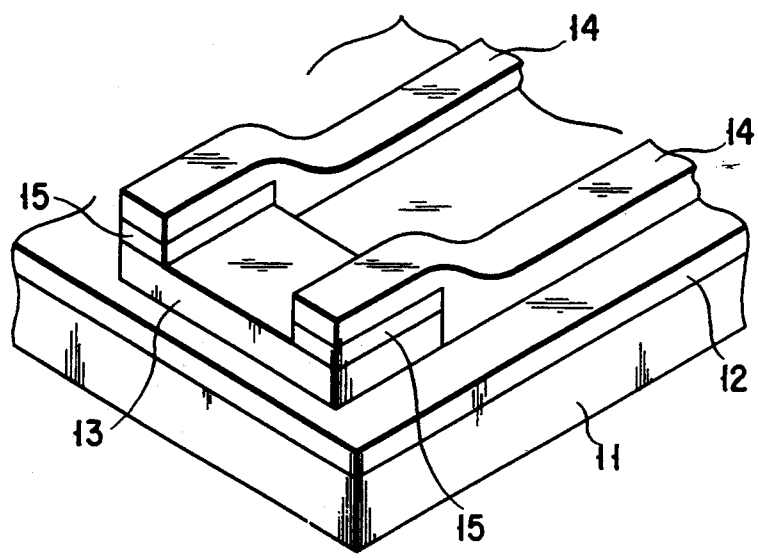
FIG. 1 is a perspective view of the main portion of a conventional magneto-resistive head.
Figure 2:
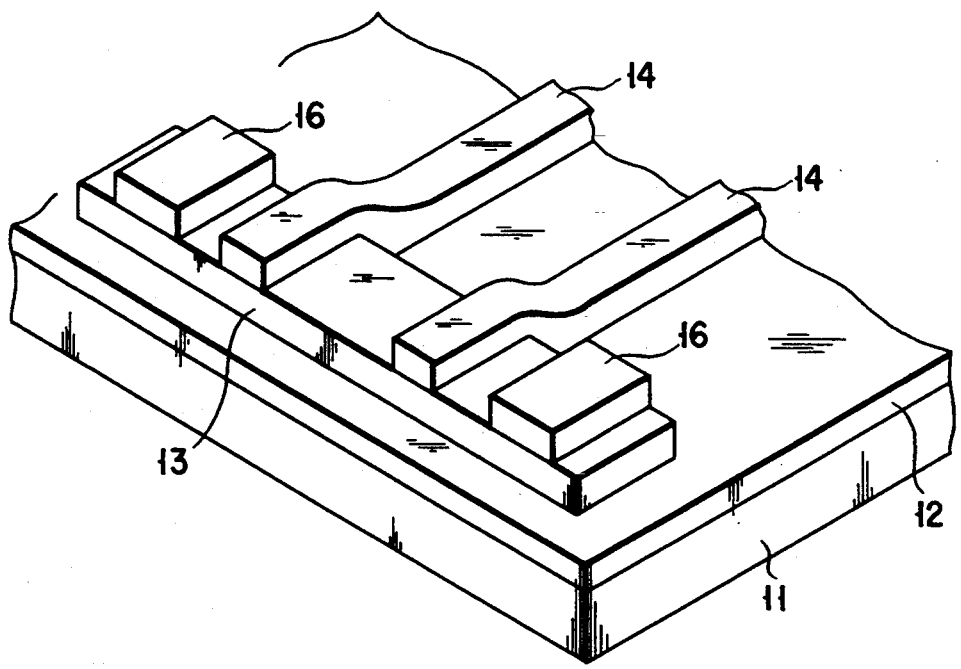
FIG. 2 is a perspective view of the main portion of another conventional magneto-resistive head.

There will now be described an embodiment of this invention with reference to the accompanying drawings.

FIG. 3 is a perspective view of the main portion of a magneto-resistive head according to one embodiment of this invention. A head base plate 1 is formed of $Al_2O_3$ or TiC, for example. An insulation layer 2 formed of $SiO_2$ or the like is disposed on the base plate 1. A strip-form magneto-resistive device (which is hereinafter referred to as an MR device) 3 is formed on the insulation layer 2. Further, conductive leads 4 for power supply are formed with one-side end portions thereof respectively disposed on two end portions of the MR device 3 in the longitudinal direction. The MR device 3 is a Permalloy (Fe-Ni alloy) film, for example. The conductive lead 4 is formed of a metal film of Cu, Al, Ti or the like.

The two end portions 5 of the MR device 3, that is, portions lying directly under the conductive leads 4 are changed into hard magnetic material layers by introducing an impurity element such as Cu, Al or Ti which is a material forming the conductive lead 4, for example. The two end portions 5 of hard magnetic material are magnetized in the longitudinal direction which is the direction of a longitudinal bias magnetic field direction as indicated by an arrow A or B in the MR device 3. By this magnetization, a bias magnetic field is applied to the MR device 3 in the longitudinal direction so that the MR device 3 may have a unimagnetic domain structure.

The magneto-resistive head of this invention has an MR device 3 which includes a first area 3A for sensing a magnetic field by the magneto-resistive characteristic and at least two second areas 3B1 and 3B2 having at least two portions which are disposed on both sides of and in contact with the first area 3A and which are formed of hard magnetic material obtained by alteration of the composition. The second areas 3B1 and 3B2 are two end portions 5 of the MR device 3.

The first area 3A is an intermediate portion of the MR device 3 extending in the longitudinal direction and sandwiched between the second areas 3B1 and 3B2.

In the above magneto-resistive head, the Barkhausen noise which may be caused by the movement of the magnetic domain wall in the MR device which is not formed with the unimagnetic domain structure will not occur.

The above magneto-resistive head can be easily formed by use of the thin film process.

Next, a first example of a method for manufacturing the magneto-resistive head of this invention is explained with reference to FIGS. 4, 5A, 5B, 5C, 5D and 5E.

Figure 5A:
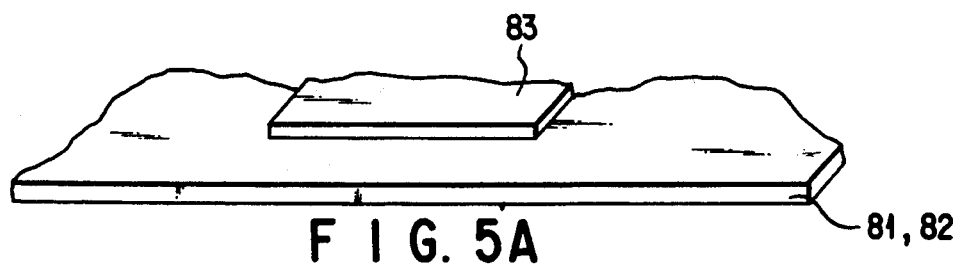
FIGS. 5A, 5B, 5C, 5D and 5E are process drawings showing the first example of a method for manufacturing the magneto-resistive head of this invention.

As shown in the step 101 of FIG. 4 and in FIG. 5A, an insulation layer 82 and a Permalloy magneto-resistive device 83 are sequentially formed on the base plate 81 by use of the sputtering device and ion beam etching device like the case wherein a normal magneto-resistive thin film magnetic head is formed.

Figure 5B:
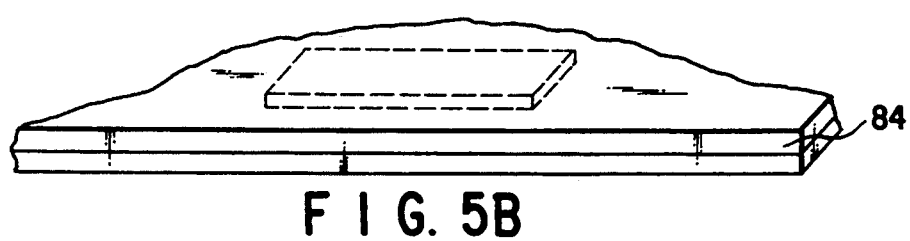

After this, as shown in the step 102 of FIG. 4 and in FIG. 5B, an $SiO_2$ film 84 is formed.

Figure 5C:
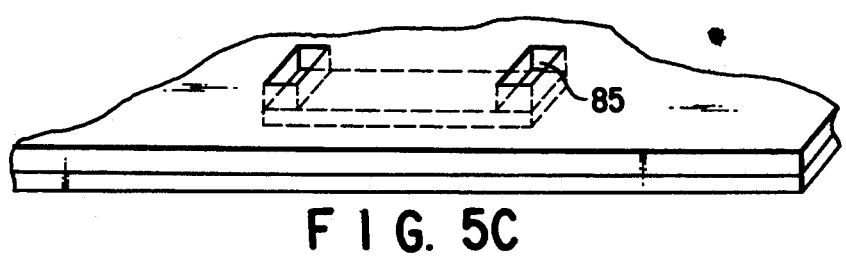

Next, as shown in the step 103 of FIG. 4 and in FIG. 5C, an opening 85 is formed only in the conductive connection part of the magneto-resistive device 83.

Then, as shown in the step 104 of FIG. 4, Cu, Al or Ti is deposited on the magneto-resistive device 83 by use of the bias sputtering method while applying a bias of 0.5 W/cm$^2$ or more to the sample. Next, Cu, Al or Ti which is the same material as that constituting the conductive lead is impregnated into the magneto-resistive device 83, and at the same time, a conductive lead film is deposited.

After this, as shown in the step 105 of FIG. 4, a heat treatment is effected under a condition of 400° C. for approx. 50 hours. The heat treatment may be effected by use of a laser. Portions which lie directly under the both end portions of the magneto-resistive device (Fe-Ni alloy) 83 and into which Cu, Al or Ti is injected are formed of Fe-Ni-Cu, Fe-Ni-Al or Fe-Ni-Ti alloys.

As is disclosed in the article by Marsh, "Alloys of Iron and Nickel", Mcgraw-hill, New York, 1938, E.P. WOHLFARTH Edition, FERROMAGNETIC MATERIALS VOL. 3, p 117, for example, the above alloy becomes a hard magnetic material having an antimagnetic force of several hundred oersteds. Preferably, the concentration of CU is 50 to 60% and the concentration of Al is 40 to 50%.

Figure 5D:
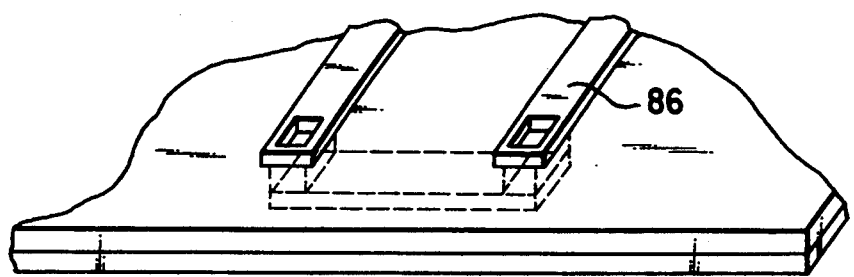

Next, as shown in the step 106 of FIG. 4 and in FIG. 5D, the Cu, Al or Ti film is etched into a preset pattern to form conductive leads 86.

Then, as shown in the step 107 of FIG. 4, a protection film which is not shown in FIG. 3 is formed.

After this, as shown in the step 108 of FIG. 4, a D.C. magnetic field intenser than the antimagnetic force of the hard magnetic material is applied to the magneto-resistive device 83 so as to magnetize the hard magnetic material in a direction which corresponds to the longitudinal direction of the hard magnetic material and is indicated by an arrow 50A or 50B as shown in FIG. 3.

Figure 5E:
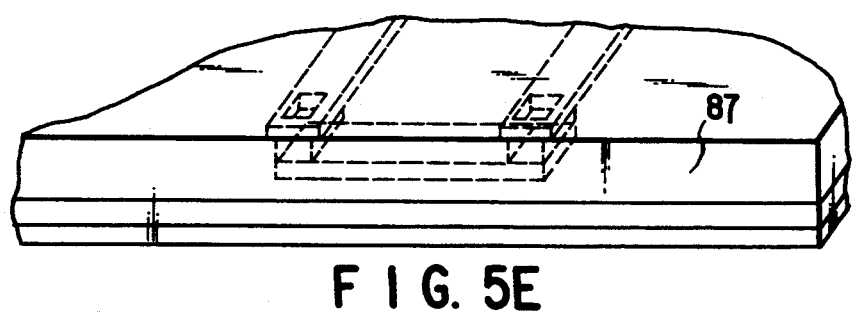

Finally, as shown in the step 109 of FIG. 4 and in FIG. 5E, a protection layer 87 is formed on the entire surface. Thus, a magneto-resistive head is completed.

Next, a second example of a method for manufacturing the magneto-resistive head of this invention is explained with reference to FIGS. 6 and 7.

Figure 6:
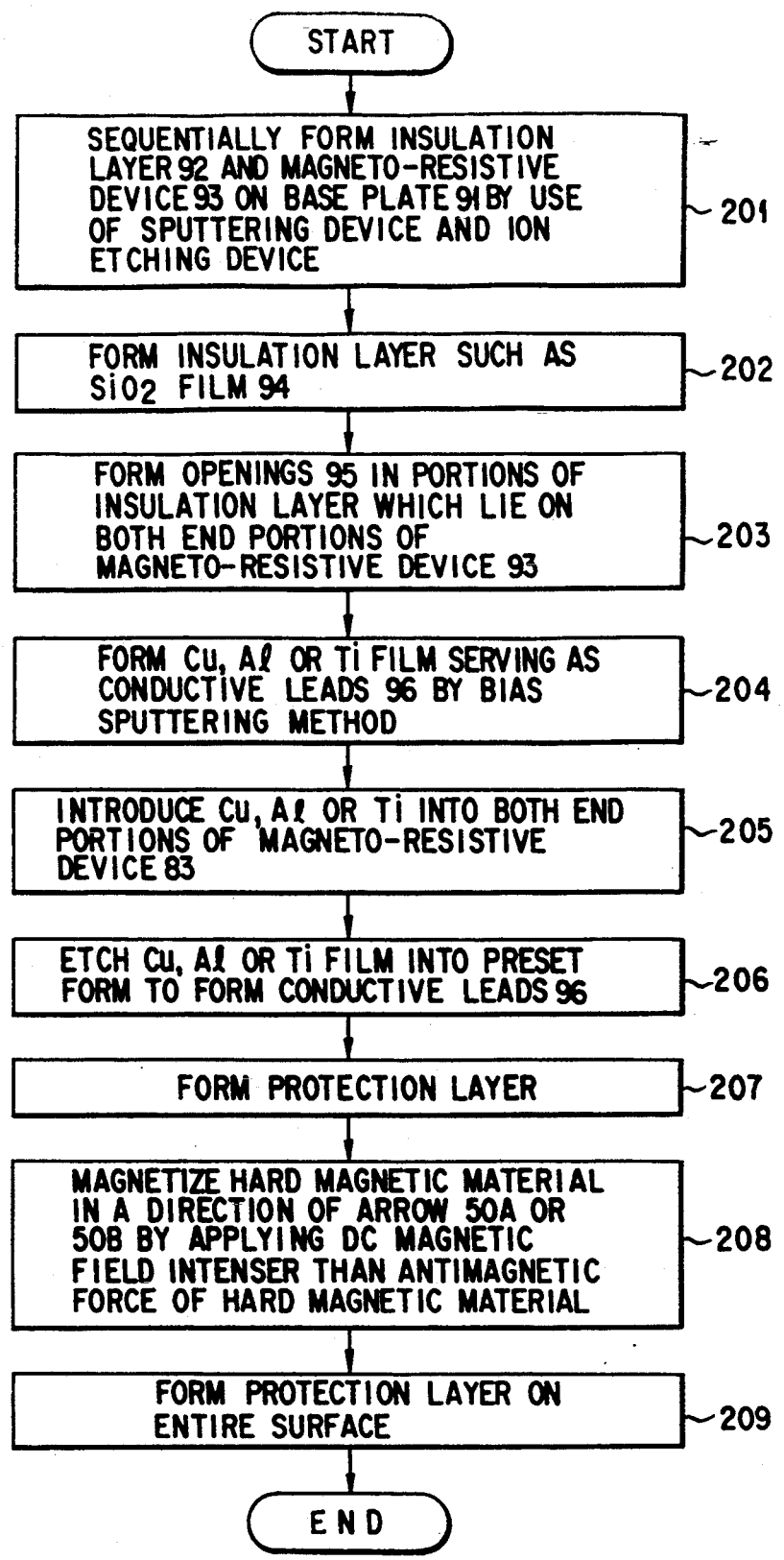
FIG. 6 is a flowchart showing a second example of a method for manufacturing the magneto-resistive head of this invention.
Figure 7A:
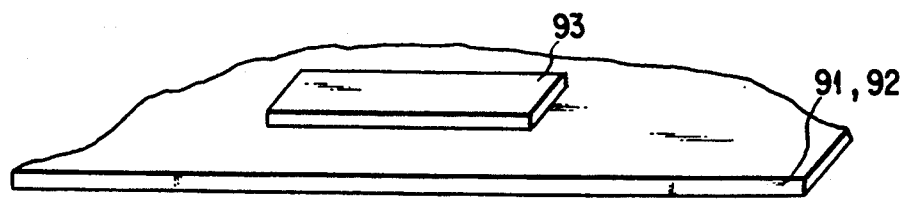
FIGS. 7A, 7B, 7C, 7D and 7E are process drawing showing the second example of a method for manufacturing the magneto-resistive head of this invention.
Figure 7B:
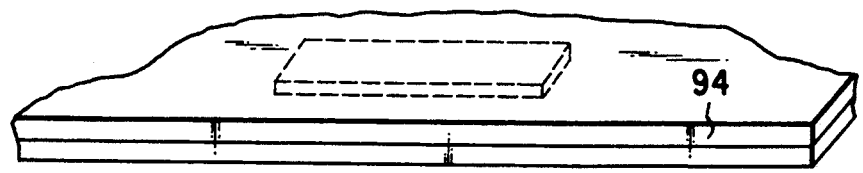
Figure 7C:
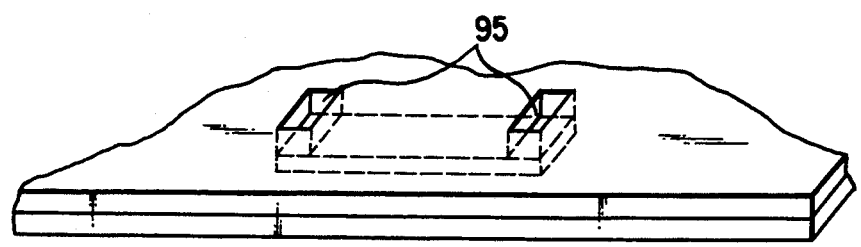

Like the first example, an insulation layer 92 and a Permalloy magneto-resistive device 93 are sequentially formed on a base plate 91 as shown in FIGS. 7A and 7B by effecting the steps 201 to 203 of FIG. 6, and then an $SiO_2$ film 94 is formed and an opening 95 is formed as shown in FIG. 7C.

Next, as shown in the step 204 of FIG. 6, Cu, Al or Ti is ion-implanted into the magneto-resistive device 93 under a condition that the ion density is approx. $10^{17}$ ions/cm$^2$ and the acceleration voltage is 50 keV. As a result, Cu, Al or Ti is distributed on the magneto-resistive device 93 with the concentration peak set at the depth of approx. 100 Å. Then, the interim product including the magneto-resistive device 93 having Cu, Al or Ti distributed thereon is subjected to the heat treatment under a condition that the temperature is set at 300° C. and the heating period of time is one hour. As a result, the concentration profile of CU, Al or Ti is made constant on the magneto-resistive device 93 and a uniform characteristic can be obtained.

Figure 7D:
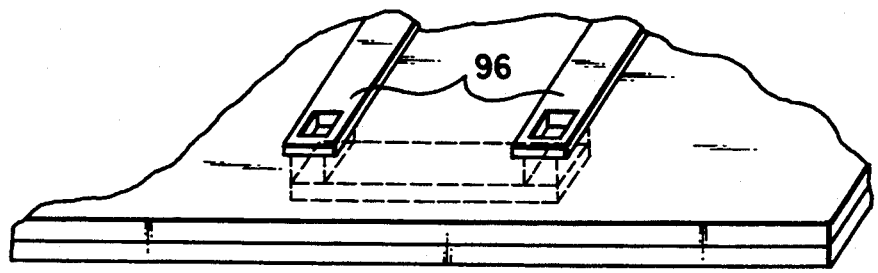

Next, as shown in the steps 205 to 207 of FIG. 6 and in FIG. 7D, conductive leads 96 are formed of Cu, Al or Ti material which is the same type of material ion-implanted in the first example to attain good ohmic contacts and then a protection layer is formed.

After this, as shown in the step 208 of FIG. 6, a D.C. magnetic field intenser than the antimagnetic force of the hard magnetic material is applied to the magneto-resistive device 93 so as to magnetize the hard magnetic material in a direction which corresponds to the longitudinal direction of the magneto-resistive device and is indicated by an arrow 50A or 50B as shown in FIG. 3.

Figure 7E:
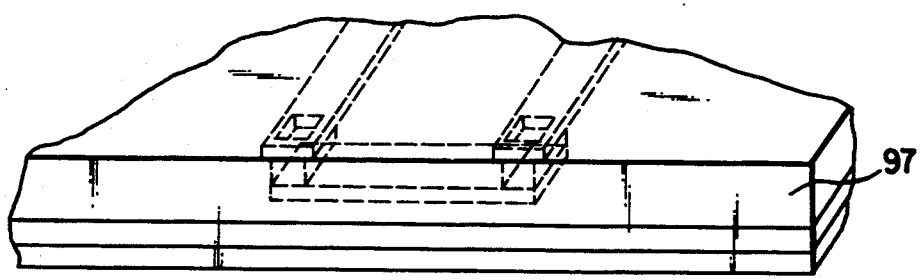

Finally, as shown in the step 209 of FIG. 6 and in FIG. 7E, a protection layer is formed on the entire surface. Thus, a magneto-resistive head is completed.

Next, another embodiment of the magneto-resistive head of this invention is explained with reference to FIG. 8. The structure of the magneto-resistive head of this embodiment is substantially the same as that of FIG. 3, but this embodiment is different from that of FIG. 3 in that the two end portions 5 of the MR device 3 which are altered into the hard magnetic material portions are magnetized in a direction indicated by an arrow 50C or 50D which is oblique with respect to the longitudinal direction x of the MR device 3.

When a sense current is caused to flow in a direction indicated by the arrow 50A if the MR device 3 is magnetized in a direction indicated by the arrow 50C, or when a sense current is caused to flow in a direction indicated by the arrow 50B if the MR device 3 is magnetized in a direction indicated by the arrow 50D, the self-bias magnetic field created by the MR device 3 according to the sense current contains a component in a direction y perpendicular to the longitudinal direction x. The y direction component of the self-bias magnetic field causes the operation point of the MR device 3 to be deviated from a point at which Hext=0 with respect to the applied magnetic field Hext in the magneto-resistivity/electromagnetic field conversion characteristic of the MR device 3 shown in FIG. 9. By combining the above self-bias magnetic field with the bias by the magnetization of the two end portions of the MR device 3 which are magnetized in the oblique direction, the MR device 3 can detect a signal magnetic field from the magnetic recording medium in a region "L" in which the characteristic is substantially linear, that is, in a region in which the resistivity $\pi$ linearly varies with respect to the applied magnetic field Hext. Therefore, the detection sensitivity of the magneto-resistive head is enhanced and a large reproduced output can be derived.

As described above, according to this invention, occurrence of the Barkhausen noise can be prevented by altering the two end portions of the MR device into hard magnetic material portions by introducing an impurity element such as the constituent material of the conductive lead into the end portions and magnetizing them to have magnetized components parallel to the longitudinal direction of the magneto-resistive device so as to cause the MR device to have a unimagnetic domain structure. In this case, since the unimagnetic domain structure can be attained without additionally using a member formed of hard magnetic material or antiferromagnetic material, the manufacturing process can be made simple, the space for the magneto-resistive head can be made small and freely set and the multi-channel of the head can be easily achieved.

Further, the operation point of the MR device can be biased by setting the direction of magnetization of the two end portions of the MR device which are altered into hard magnetic portions in an oblique direction with respect to the longitudinal direction of the MR device, thus making it possible to enhance the linearity of the response of the head and derive a large reproduced output.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of manufacturing a magneto-resistive head adapted to be used as the reproducing head of a magnetic recording/reproducing device, including a magneto-resistive device having a specified dimension in the longitudinal direction and conductive leads connected to both end portions of said magneto-resistive device in the longitudinal direction, comprising the steps of:
   forming said conductive leads on both end portions of said magneto-resistive device in the longitudinal direction; and
   introducing a preset amount of material forming said conductive leads into both end portions of said magneto-resistive device in the longitudinal direction, so as to form both end portions of said magneto-resistive device in the longitudinal direction as hard magnetic material areas.

2. A method of manufacturing a magneto-resistive head according to claim 1, wherein said both end portions of said magneto-resistive device in the longitudinal direction are magnetized in a direction parallel to the longitudinal direction of said magneto-resistive device.

3. A method of manufacturing a magneto-resistive head according to claim 1, wherein said both end portions of said magneto-resistive device in the longitudinal direction are magnetized in a direction oblique with respect to the longitudinal direction of said magneto-resistive device.

4. A method of manufacturing a magneto-resistive head according to claim 1, further comprising the steps of:
   forming an insulation layer on which said magneto-resistive device is formed; and
   forming a head base plate on which said insulation layer is formed.

5. A method of manufacturing a magneto-resistive head according to claim 4, wherein said insulation layer is formed of a $SiO_2$ film.

6. A method of manufacturing a magneto-resistive head according to claim 4, wherein said head base plate is formed of $Al_2O_3$ or TiC.

7. A method of manufacturing a magneto-resistive head according to claim 1, wherein said magneto-resistive device is formed of a permalloy film (Fe-Ni alloy).

8. A method of manufacturing a magneto-resistive head according to claim 1, wherein said conductive leads are formed of a metal film of Cu, Al or Ti.

9. A method of manufacturing a magneto-resistive head according to claim 1, wherein said both end portions of said magneto-resistive device in the longitudinal direction are formed of an Fe-Ni-Cu alloy, an Fe-Ni-Al alloy or an Fe-Ni-Ti alloy.

10. A method of manufacturing a magneto-resistive head according to claim 9, wherein the concentration of Cu is 50 to 60%.

11. A method of manufacturing a magneto-resistive head according to claim 9, wherein the concentration of Al is 40 to 50%.

12. A method of manufacturing a magneto-resistive head adapted to be used as the reproducing head of a magnetic recording/reproducing device, including a magneto-resistive device having a specified dimension in the longitudinal direction and conductive leads connected to both end portions of said magneto-resistive device in the longitudinal direction, comprising the steps of:
   ion-implanting a preset amount of metal into the both end portions of said magneto-resistive device in the longitudinal direction, so as to form both end portions of said magneto-resistive device in the longitudinal direction as hard magnetic material areas, and
   forming said conductive leads on both end portions of said magneto-resistive device in the longitudinal direction.

13. A method of manufacturing a magneto-resistive head according to claim 12, wherein said both end portions of said magneto-resistive device in the longitudinal direction are magnetized in a direction parallel to the longitudinal direction of said magneto-resistive device.

14. A method of manufacturing a magneto-resistive head according to claim 12, wherein said both end portions of said magneto-resistive device in the longitudinal direction are magnetized in a direction oblique with respect to the longitudinal direction of said magneto-resistive device.

15. A method of manufacturing a magneto-resistive head according to claim 12, further comprising the steps of:
   forming an insulation layer on which said magneto-resistive device is formed; and
   forming a head base plate on which said insulation layer is formed.

16. A method of manufacturing a magneto-resistive head according to claim 15, wherein said insulation layer is formed of a $SiO_2$ film.

17. A method of manufacturing a magneto-resistive head according to claim 15, wherein said head base plate is formed of $Al_2O_3$ or TiC.

18. A method of manufacturing a magneto-resistive head according to claim 12, wherein said magneto-resistive device is formed of a permalloy film (Fe-Ni alloy).

19. A method of manufacturing a magneto-resistive head according to claim 12, wherein said conductive leads are formed of a metal film of Cu, Al or Ti.

20. A method of manufacturing a magneto-resistive head according to claim 12, wherein said both end portions of said magneto-resistive device in the longitudinal direction are formed of an Fe-Ni-Cu alloy, an Fe-Ni-Al alloy or an Fe-Ni-Ti alloy.

21. A method of manufacturing a magneto-resistive head according to claim 20, wherein the concentration of Cu is 50 to 60%.

22. A method of manufacturing a magneto-resistive head according to claim 20, wherein the concentration of Al is 40 to 50%.

23. A method of manufacturing a magneto-resistive head adapted to be used as the reproducing head of a magnetic recording/reproducing device, including a magneto-resistive device having a specified dimension in the longitudinal direction and conductive leads connected to both end portions of said magneto-resistive device in the longitudinal direction, comprising the steps of:

forming said conductive leads on both end portions of said magneto-resistive device in the longitudinal direction; and subjecting overlapped portions of said conductive leads and said magneto-resistive device to a thermal diffusion process, so as to form both end portions of said magneto-resistive device in the longitudinal direction as hard magnetic areas.

24. A method of manufacturing a magneto-resistive head according to claim 23, wherein said both end portions of said magneto-resistive device in the longitudinal direction are magnetized in a direction parallel to the longitudinal direction of said magneto-resistive device.

25. A method of manufacturing a magneto-resistive head according to claim 23, wherein said both end portions of said magneto-resistive device in the longitudinal direction are magnetized in a direction oblique with respect to the longitudinal direction of said magneto-resistive device.

26. A method of manufacturing a magneto-resistive head according to claim 23, further comprising the steps of:

forming an insulation layer on which said magneto-resistive device is formed; and forming a head base plate on which said insulation layer is formed.

27. A method of manufacturing a magneto-resistive head according to claim 26, wherein said insulation layer is formed of a $SiO_2$ film.

28. A method of manufacturing a magneto-resistive head according to claim 26, wherein said head base plate is formed of $Al_2O_3$ or TiC.

29. A method of manufacturing a magneto-resistive head according to claim 23, wherein said magneto-resistive device is formed of a permalloy film (Fe-Ni alloy).

30. A method of manufacturing a magneto-resistive head according to claim 23, wherein said conductive leads are formed of a metal film of Cu, Al or Ti.

31. A method of manufacturing a magneto-resistive head according to claim 23, wherein said both end portions of said magneto-resistive device in the longitudinal direction are formed of an Fe-Ni-Cu alloy, an Fe-Ni-Al alloy or an Fe-Ni-Ti alloy.

32. A method of manufacturing a magneto-resistive head according to claim 31, wherein the concentration of Cu is 50 to 60%.

33. A method of manufacturing a magneto-resistive head according to claim 31, wherein the concentration of Al is 40 to 50%.

* * * * *